(12) United States Patent
Dixon et al.

(10) Patent No.: US 8,159,390 B2
(45) Date of Patent: Apr. 17, 2012

(54) TEMPORAL CW NULLER

(75) Inventors: William F. Dixon, Tucson, AZ (US);
Troy D. Fuchser, Tuscon, AZ (US);
Abraham L. Craig, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1419 days.

(21) Appl. No.: 11/693,066

(22) Filed: Mar. 29, 2007

(65) Prior Publication Data
US 2010/0259437 A1 Oct. 14, 2010

(51) Int. Cl.
*G01S 19/21* (2010.01)
(52) U.S. Cl. .................................. 342/357.59
(58) Field of Classification Search ............ 342/357.59, 342/357.61, 357.76; 375/144, 148, 347, 375/349, 351, E1.021, E1.022, E1.023, E1.032; 455/278.1
See application file for complete search history.

(56) References Cited

U.S. PATENT DOCUMENTS

| | | | | |
|---|---|---|---|---|
| 4,079,318 A | * | 3/1978 | Kinoshita | 455/139 |
| 4,340,872 A | * | 7/1982 | Alter | 333/152 |
| 4,952,193 A | | 8/1990 | Talwar | |
| 4,972,434 A | * | 11/1990 | Le Polozec et al. | 375/232 |
| 5,019,793 A | * | 5/1991 | McNab | 333/156 |
| 5,062,148 A | * | 10/1991 | Edwards | 455/506 |
| 5,068,668 A | * | 11/1991 | Tsuda et al. | 342/362 |
| 5,304,945 A | * | 4/1994 | Myer | 330/149 |
| 5,410,750 A | * | 4/1995 | Cantwell et al. | 455/306 |
| 5,796,307 A | * | 8/1998 | Kumagai et al. | 330/149 |
| 5,920,278 A | * | 7/1999 | Tyler et al. | 342/33 |
| 6,094,166 A | * | 7/2000 | Martek et al. | 342/374 |
| 6,115,409 A | * | 9/2000 | Upadhyay et al. | 375/144 |
| 6,744,316 B2 | * | 6/2004 | Louis et al. | 330/151 |
| 6,967,992 B1 | * | 11/2005 | Rabaeijs et al. | 375/150 |
| 2005/0069063 A1 | | 3/2005 | Waltho et al. | |
| 2005/0159124 A1 | * | 7/2005 | Shah | 455/226.1 |
| 2005/0226353 A1 | * | 10/2005 | Gebara et al. | 375/346 |
| 2006/0009185 A1 | * | 1/2006 | Shamsaifar et al. | 455/278.1 |

FOREIGN PATENT DOCUMENTS

| | | |
|---|---|---|
| JP | 2006/145315 | 6/2006 |
| WO | 99/00872 | 1/1999 |
| WO | 2005/050896 | 6/2005 |

OTHER PUBLICATIONS

International Preliminary Report on Patentability for International Application No. PCT/US2008/058176 mailed Mar. 2, 2009.
International Search Report and Written Opinion for International Application No. PCT/US2008/058176 mailed Sep. 24, 2008.

* cited by examiner

*Primary Examiner* — Harry Liu
(74) *Attorney, Agent, or Firm* — Renner, Otto, Boisselle & Sklar, LLP

(57) ABSTRACT

A temporal nuller for removing or minimizing narrow band interference/jamming power from a global positioning system (GPS) receiver's input includes a first signal path having a first input and a first output, at least one time delay device and an adjustable phase shift device located within the first signal path, and a second signal path having a second input and a second output. The first signal input is connected to the second signal input, and the first signal output is connected to the second signal output. Further, the at least one time delay device is operative to introduce a time delay between a signal at an output of the at least one time delay device relative to a signal at an input of the at least one time delay device.

18 Claims, 7 Drawing Sheets

TEMPORAL CW NULLER

FIELD OF THE INVENTION

The present invention relates to global positioning systems and, more particularly, to a device and method for reducing and/or removing narrow band interference/jamming power from a global positioning system receiver's input.

BACKGROUND OF THE INVENTION

As more weapon and fire-control systems become dependent on GPS (Global Positioning System) for their accuracy and effectiveness, it becomes important for GPS receivers to be able to withstand RF (Radio Frequency) signal interferences, especially under a highly dynamic engagement scenario. The RF interference can adversely affect GPS receiver code and carrier tracking, resulting in degraded and unsatisfactory navigation performance.

In essence, a GPS system receiver determines its terrestrial location by triangulating its position relative to GPS satellites in orbit around the earth, by receiving signals transmitted from the satellites, measuring the travel times of the signals from the satellites to the receiver, and then calculating the distances of the satellites from the receiver based on the travel time. To measure the travel time, very accurate timing is necessary and, therefore, the GPS satellites carry atomic clocks. The receiver also needs to know the exact positions of the GPS satellites. In addition, for further accuracy the receiver compensates for atmospheric effects on travel time of the satellite signals to the receiver.

One basic function of a GPS receiver is to generate replica signals that can be correlated with the received satellite signals. Each GPS satellite can have a unique digital code sequence (e.g., a Pseudo Random Code) that is by analogy similar to a musical tune, so that the GPS receiver can distinguish signals from different GPS satellites. The GPS receiver knows the "tunes" or code sequences of the different GPS satellites, knows when the "tunes" are to be transmitted, and knows where the GPS satellites should be.

Upon receiving a code signal, the GPS receiver identifies the signal, generates a replica of the code signal, and seeks to "hum along" or synchronize the replica signal with the received code, and thereby track the received signal. This signal tracking includes two fundamental functions: code-phase tracking to track digital codes of received satellite signals, and carrier-phase tracking to track the carrier signals that are conveying the digital codes. When the receiver is receiving a code signal from a GPS satellite and the receiver's clock is synchronized with the clock onboard the satellite, then an amount of time that the receiver must delay the code replica signal to synchronize or correlate it with the received code signal is the amount of time it takes the received signal to travel from the satellite to the receiver. The receiver can use this time interval to determine a geographic distance between the satellite and the receiver. Signals from four or more different GPS satellites enable the receiver to synchronize its clock with the clocks onboard the satellites.

GPS satellites operated by the U.S. military transmit two different signals on two different carrier frequencies. The first carrier frequency, L1, has a frequency of 1575.42 MHz and carries two pseudo random digital codes as well as a status message (containing, for example, supplemental information regarding the satellite's orbit, the accuracy of its clock, and so forth). The first digital code on L1 is called a C/A (Coarse Acquisition) code. The U.S. military makes the C/A code for each U.S. GPS satellite known and available to the public sector. The C/A code repeats every 1023 bits, and modulates the L1 carrier frequency at a 1 MHz rate. The second carrier frequency, L2, has a frequency of 1227.60 MHz. In addition to the C/A codes transmitted on the L1 carrier frequency of the U.S. GPS satellites, a P(Y) code ("P" for precise, and "(Y)" when the code is encrypted) is also broadcast from each satellite on both the L1 and L2 carrier frequencies. The P(Y) codes are intended for exclusive use by the military. Each P(Y) code repeats on a 7-day cycle and modulates both the L1 and L2 carrier frequencies at a 10 MHz rate. Transmission of codes on two different carrier frequencies also allows military receivers to estimate atmospheric effects based on the different refractive effects that the atmosphere has on the two different carrier frequencies.

A problem with conventional GPS receivers is that if they are physically located near or otherwise are in the presence of interference (e.g., narrow band interference/jamming power), successful GPS tracking may not be possible or accuracy may be reduced. Prior attempts to address this problem included down converting the L-band GPS signal to a suitable frequency (IF) for digitization and then converting the GPS input signal to the digital domain. Then, while in the digital domain, the narrow band interference is removed using Fourier transformations or other equally complex techniques. For GPS anti-jam applications, once the narrow band interference is removed, the signal is converted back to an IF frequency, and then upconverted to L-band. Some systems bypass the IF conversion scheme and connect directly into the baseband processing chips of the receiver.

As is evident, a drawback to the above approach is that it adds significant complexity. First, the signal must be converted to the digital domain, which by itself is not significantly complex. However, the application of Fourier transformations adds significant complexity, as the calculations can be very intensive. Such complex calculations can consume significant processing power and/or require complex circuitry to implement.

Accordingly, there is a need in the art for a device and method for simply removing or minimizing the effect of narrow band interference/jamming power. This would enable a GPS receiver to accurately determine a position while the receiver is in the presence of jamming signals and/or narrow band interference.

SUMMARY OF THE INVENTION

A device and method in accordance with present invention enables narrow band interference/jamming power to be easily and efficiently removed from a GPS signal, thereby improving GPS tracking while in the presence of such interference/jamming power. The interference/jamming power may be removed by forming a narrow band null in the received GPS signal. The null can be formed by splitting an input signal into multiple paths and inserting a delay (preferably a fixed delay) in one path. Further, an adjustable phase shift can be inserted in the delayed path to adjust the frequency at which the null appears. The signal processed by the delayed path then can be recombined with a signal processed by a non-delayed path, thereby forming the narrow band null. As a result, the portion of the signal that passed through the non-delayed path is passed unimpeded to the GPS receiver, while the portion of the signal that passed through the delayed path is rejected by the GPS receiver.

The fixed delay can be adjusted so that it does not interfere with the GPS receiver's ability to recover the total GPS signal without degradation. This occurs because if the delay is greater than one code chip (e.g., 97 nanoseconds in the case of GPS P(Y) code modulation), the GPS spread spectrum will not correlate with the delayed version. Further, the delayed signal also may be shifted in phase, thereby enabling the null to be tuned for specific frequency ranges, as well as to adjust the power output of the nuller.

According to one aspect of the invention, a temporal nuller for removing or minimizing narrow band interference/jamming power from a global positioning system (GPS) receiver's input includes a first signal path including a first input node and a first output node; at least one time delay device located within the first signal path, said at least one time delay device operative to introduce a time delay between a signal at an output of the at least one time delay device relative to a signal at an input of the at least one time delay device; a second signal path including a second input node and a second output node, wherein the first signal input node is connected to the second signal input node, and the first signal output node is connected to the second signal output node. The temporal nuller also may include an adjustable phase shifter in the first signal path. The phase shifter enables a frequency at which the null appears to be adjusted.

According to another aspect of the invention, a method for removing or minimizing narrow band interference/jamming power from a global positioning system (GPS) receiver's input signal includes forming a narrow band null in at least a portion of the input signal. The narrow band null can be formed by splitting a GPS signal into a first signal path and a second signal path, introducing a time delay, which preferably is a fixed time delay, into the first signal path and, recombining the first and second signal paths. Further, an adjustable phase shift may be introduced in the first signal path.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Additionally, in the drawings, like reference numerals designate corresponding parts throughout the several views.

DESCRIPTION OF THE INVENTION

Figure 1:
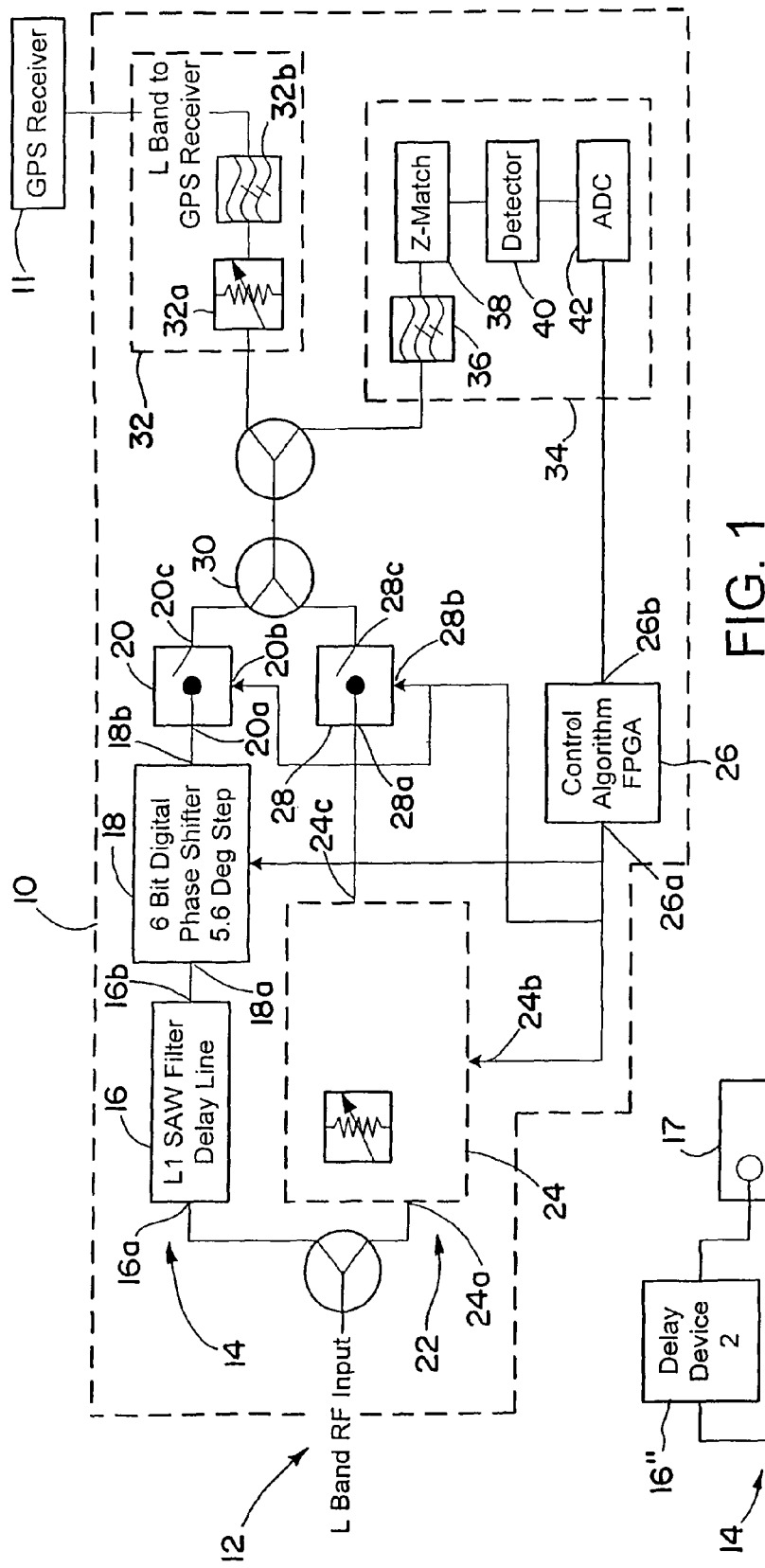
FIG. 1 is a schematic diagram of an exemplary temporal nuller in accordance with the invention.

The following is a detailed description of the present invention with reference to the attached drawings, wherein like reference numerals will refer to like elements throughout.

Referring initially to FIG. 1, a block diagram of an exemplary temporal nuller 10 in accordance with the invention is shown, wherein the nuller 10 provides a signal to a GPS receiver 11. The GPS temporal nuller 10 can reduce the amplitude of narrow band interference on the GPS receiver 11 by forming nulls in the received GPS signal. Further, the null may be phase shifted so as to alter the frequency or frequencies at which the nulls appear and/or to adjust the power output of the nuller 10. More specifically, by phase shifting the signal, the null location can be adjusted as the frequency in the GPS pass band shifts. As a result, the GPS receiver 11 can operate in areas where narrow band interference and/or jamming power are present.

With continued reference to FIG. 1, an RF (radio frequency) input 12 to the nuller 10 is split into at least two paths. A first or primary path 14 (the delayed path) is routed to an input 16a of a delay element 16. The delay element 16 may be any circuit, processor, device, etc. that introduces a time delay between a signal presented at the input 16a relative to a signal at the output 16b (e.g., data provided at the input of the delay element is seen at the output of the delay element after a predetermined delay period).

An example of a delay element is a surface acoustic wave (SAW) device (e.g., a SAW filter). As is well known, a SAW device is an electromechanical device wherein electrical signals are converted to mechanical acoustic waves in a piezoelectric crystal. This wave is delayed as it propagates across the crystal before being converted back to an electrical signal by further electrodes. While the delay element preferably is a SAW device, other delay elements may be utilized without departing from the scope of the invention. For example, digital delay lines, optical delays, or the like may be used in place of the SAW device.

The delay element 16 can be adjustable (i.e., the delay time can be varied) so as to not interfere with the GPS receiver's ability to recover the total GPS signal without degradation or distortion. This occurs because the GPS spread spectrum will not correlate with a delayed version of the signal if the delay is greater than the period for one code chip (97 nanoseconds in the case of GPS P(Y) code modulation). The delay can be calculated (e.g., within 1 or more P(Y) code chip delays of the GPS receiver, and preferably 2 P(Y) code chip delays) and the calculated value can be used to select or configure the delay element 16. An exemplary delay that can be used in the exemplary temporal nuller 10 is a SAW filter with a delay set for about 225 nanoseconds.

Figure 2:
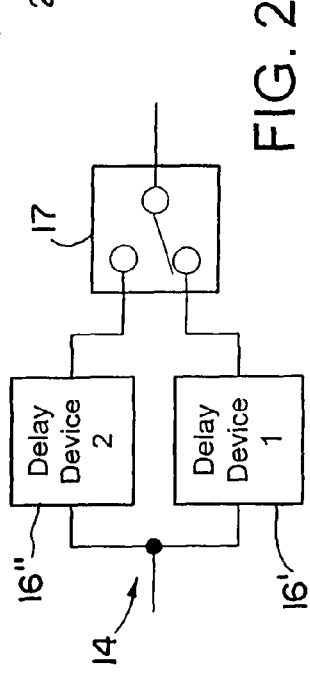
FIG. 2 is a schematic diagram illustrating a plurality of delay elements arranged in a parallel configuration in accordance with the invention.

It is noted that while only a single delay element 16 is shown in FIG. 1, multiple delay elements may be utilized for operation in multiple bands (e.g., the L1 band (1575 MHz) and the L2 band (1227 MHz)). For example, and briefly referring to FIG. 2, two different delay elements may be utilized in the first path 14, wherein a first delay element 16' is configured for the L1 frequency band, and a second delay element 16" is configured for the L2 frequency band. The two delay elements 16' and 16" may be connected in parallel, and a switch 17 can be coupled to the outputs of the respective delay elements (the switch may be configured or controlled by the controller, which is discussed below). Based on a position of the switch 17, the nuller 10 may operate in two different frequency bands (e.g., L1 and L2). As will be appreciated, additional delay elements may be added to further increase the number of nulls or narrow band jammers that can be handled by the nuller.

Referring back to FIG. 1, the output 16b of the delay element can be provided to an input 18a of phase shifter 18, which can introduce a phase shift into the delayed signal. As is well known, phase shifters change the transmission phase angle of a signal. The phase shifter 18 enables the frequencies at which the nulls appear to be adjusted or otherwise varied (e.g., to move the nulls to higher or lower frequency ranges). In other words, the nulls can be tuned to "notch out" the interfering frequency in the GPS band. The phase shifter 18 may be a digitally controlled phase shifter, or an analog adjustment of phase (e.g., via pin diodes or via digital switching of pin diodes). A phase shift also may be implemented via delay lines, or any other means of introducing a phase shift. An output 18b of the phase shifter 18 can be coupled to an input 20a of switch 20.

Switch 20 includes a select terminal 20b or the like that controls the operation of the switch 20 (the select terminal 20b can be coupled to an output 26a of controller 26, which is discussed in more detail below). For example, if a signal (e.g., a logic 1, TRUE, 3 volts, etc.) is present at the select terminal 20b, the switch will close, thereby coupling the input terminal 20a to the output terminal 20c. If the signal is not present at the select terminal 20b (e.g., a logic 0, FALSE, 0 volts, etc.), then the switch 20 will open and the input terminal 20a will be decoupled from the output terminal 20c. As will be appreciated, other forms of signals may be utilized to operate the switch 20. For example, the switch 20 may receive commands via a serial communication link or the like (not shown), wherein such signals may be processed by the switch 20 and then acted upon. Further, the switch 20 may be an electromechanical switch (e.g., a micro-electro mechanical system switch, micro relay, or the like) or an electrical device (e.g., one or more transistors or the like).

Moving back to the input 12, a secondary path 22 (the non-delayed path) can be routed to a first input 24a of an attenuator 24. The attenuator can be used to adjust an amplitude of the primary GPS signal, which can compensate for losses in the primary (i.e., delayed) path 14 (e.g., to compensate for losses created by the delay element 16 and the phase shifter 18) and/or to balance the primary and secondary paths 14 and 22 (e.g., balance the amplitudes of signals in the primary and secondary paths). This enables a deeper, more effective null to be obtained. As will be appreciated, any type of signal attenuator may be used as the attenuator 24.

Attenuation control can be provided via a second input 24b of the attenuator 24. This second input 24b may be coupled to an output 26a of controller 26 and is discussed in more detail below. Although only a single output 26a is shown on the controller 26, it will be appreciated that multiple outputs may exist depending on communication means utilized by the controller. For example, a single output may suffice for parameters communicated via a serial communication link, while multiple outputs may be needed when using discrete outputs and/or inputs.

Based on the signal presented at the second input terminal 24b, the attenuation of the attenuator 24 may be adjusted (e.g., for a 0-10 V signal, 0 V may correspond to minimum attenuation, and 10V may correspond to maximum attenuation). An output signal 24c of the attenuator 24 may be provided to an input terminal 28a of switch 28. Like switch 20 above, switch 28 also includes a select terminal 28b that controls the operation of the switch 28 (i.e., coupling or decoupling the input terminal 28a from the output terminal 28c). The select terminal 28b also may be coupled to the output 26a of controller 26.

The output 20c, 28c of switches 20, 28, respectively, are combined at summing junction 30 to form a recombined path. The recombined path then may be split to go to the nuller output section 32 (which provides the nulled signal to the GPS receiver 11) and a power detection circuit 34. The output section 32 can include an attenuator 32a and a filter 32b for conditioning the nulled signal prior to feeding the signal to the GPS receiver 11.

The power detection circuit 34 measures the output power of the nuller 10, and the measured power in digital form is provided at input 26b of the controller 26 (the controller adjusts nuller parameters to minimize power output as discussed below). Preferably, the power detection circuit 34 implements a log detection function with a 60 dB linear dynamic range, although other types of power detection and/or dynamic ranges may be implemented. Further, the power detection circuit 34 can comprise conventional components and can include, for example, a filter 36 (e.g., a low pass filter or the like), an impedance matching circuit 38, a detector circuit 40 for determining the power level, and an analog to digital converter 42 for converting the data to digital form for use by the controller 26.

An algorithm for controlling the attenuator 24, phase shifter 18 and switches 20 and 28 may be implemented in controller 26 as a field programmable array (FPGA), via code executed by a processor, or the like. By implementing the control algorithm, the null depth can be assessed and the optimal settings for the phase shifter 18 and attenuator 24 can be determined and set.

More specifically, the controller 26 executes the algorithm stored therein so as to adjust parameters of the nuller 10 that affect power output. By varying an amount of phase shift introduced by the phase shifter 18 and by monitoring the actual power output by the nuller 10, the controller 26 can find an optimum phase shift that produces minimum power output. In addition, the controller 24 can adjust the attenuation of the attenuator 24 so as to balance the primary and secondary paths 14 and 22 to obtain the same amplitude in both paths.

Further, the controller may configure switches 20 and 28 so as to enable and/or disable operation of the nuller 10. For example, by opening switch 20 and closing switch 28, the nuller 10 operates in reference pass all mode, wherein all signals are pass through the second path 22. In this mode, the nuller 10 is effectively disabled.

Figure 3:
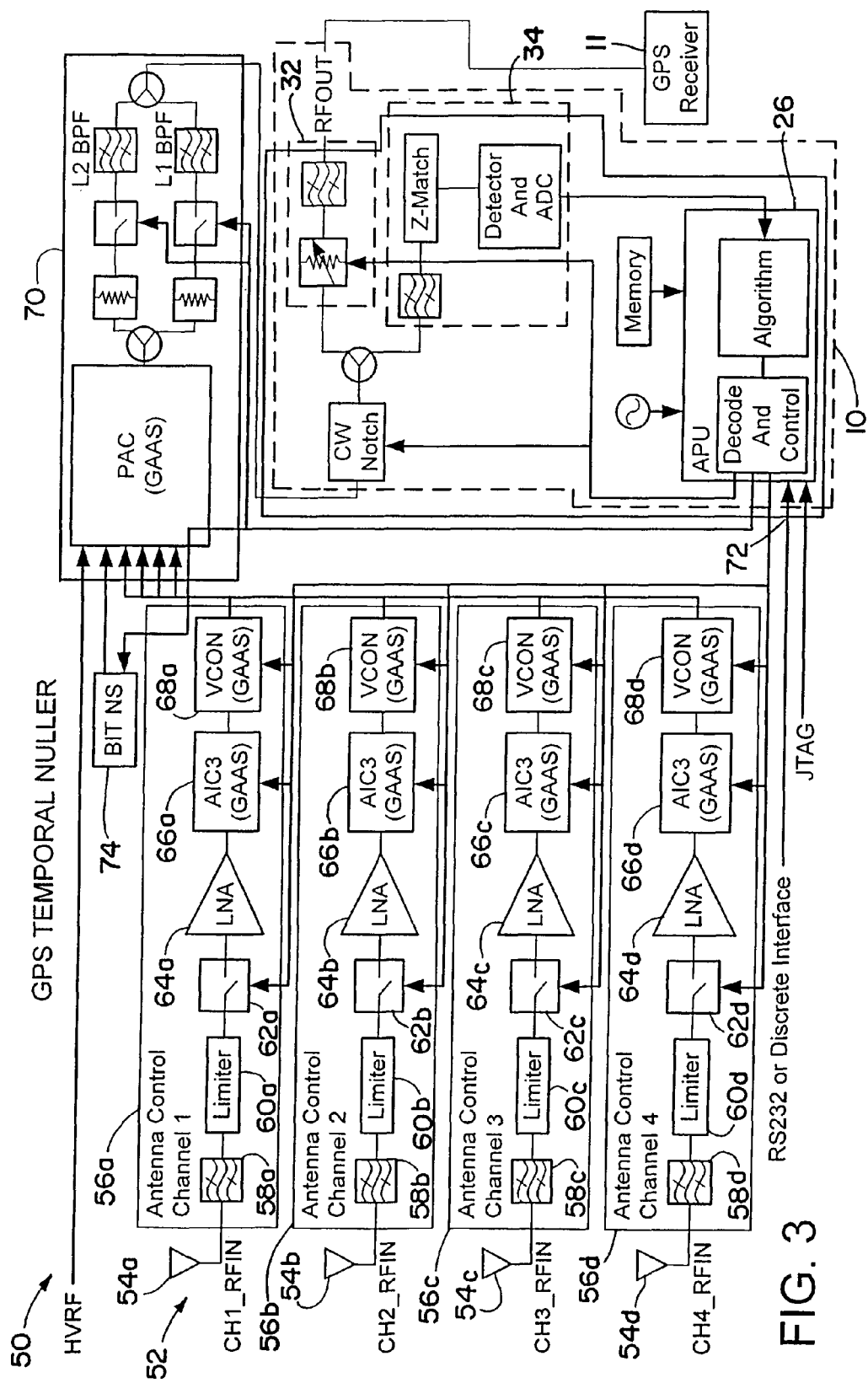
FIG. 3 is a schematic diagram of an exemplary nuller that includes both a spatial nuller and a temporal nuller in accordance with the invention.

Moving to FIG. 3, an exemplary implementation of the GPS temporal nuller with a spatial nuller is shown. The combined spatial and temporal nuller 50 can include a plurality of multiple antenna paths 52 for receiving the GPS signal, wherein each path can include an antenna 54*a*-54*d* coupled to antenna control units 56*a*-56*d*. Each antenna control unit 56*a*-56*d* can include a respective filter 58*a*-58*d*, limiter 60*a*-60*d*, enable switch 62*a*-62*d*, low noise amplifier 64*a*-64*d*, antenna interface chip (AIC3) 66*a*-66*d* (e.g., an amplifier) and vector controller (VCON) 68*a*-68*d* (e.g., a weight network). These independent front end paths can be individually weighted to form spatial nulls in the total antenna pattern. The output of these paths then can be combined and provided to a signal conditioner 70 where they may be band-pass filtered, and then sent to the temporal nuller 10. The signal conditioner 70 also may receive a host vehicle RF input (HVRF).

The output of the temporal nuller 10 then can be provided to the GPS receiver 11 as discussed in FIG. 1, and the receiver can process the GPS signal for navigation purposes. The phase and attenuation values of the temporal nuller 10 can be adjusted via the controller 26 (e.g., an algorithm processing unit (APU) or the like that includes or otherwise implements the control algorithm). The controller 26 may include memory (both volatile and non-volatile) and a programming port 72 (e.g., a serial port or the like for loading the algorithm). Further, the controller 26 can provide control signals to the time delay device 16, phase shift device 18, the antenna control units 56*a*-56*d*, the signal conditioner 70, and the built in test noise source (BIT NS) 74.

Figure 4:
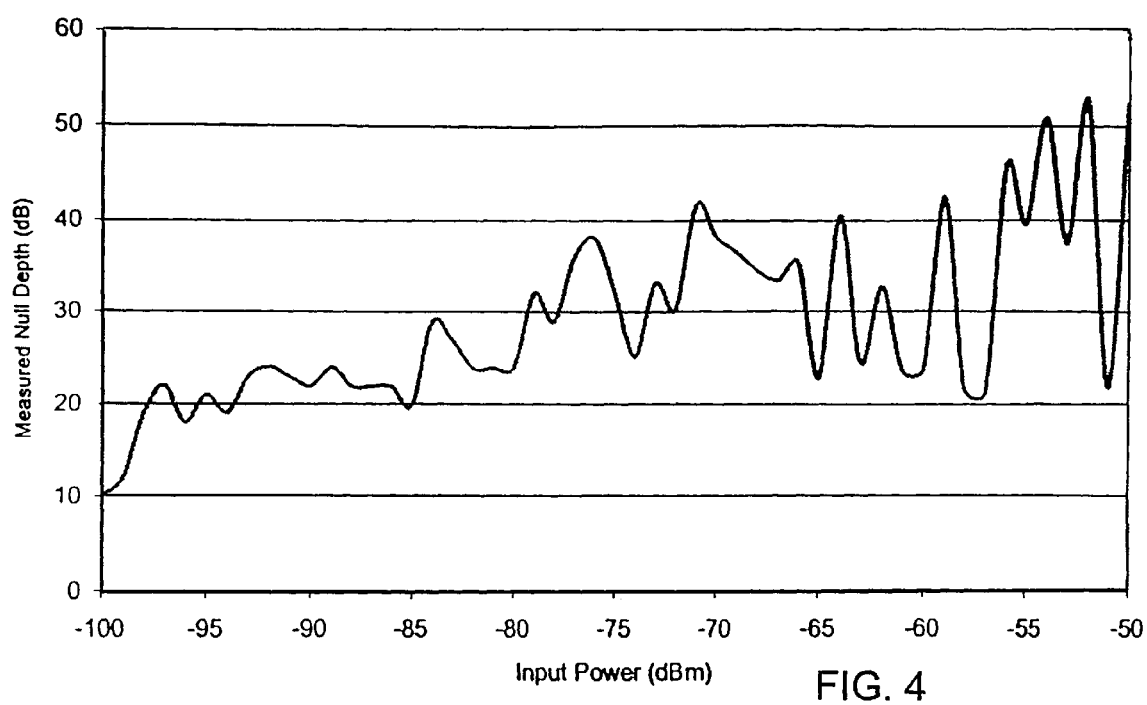
FIG. 4 is a graph showing measured null depth versus input power for an exemplary temporal nuller in accordance with the invention.
Figure 5:
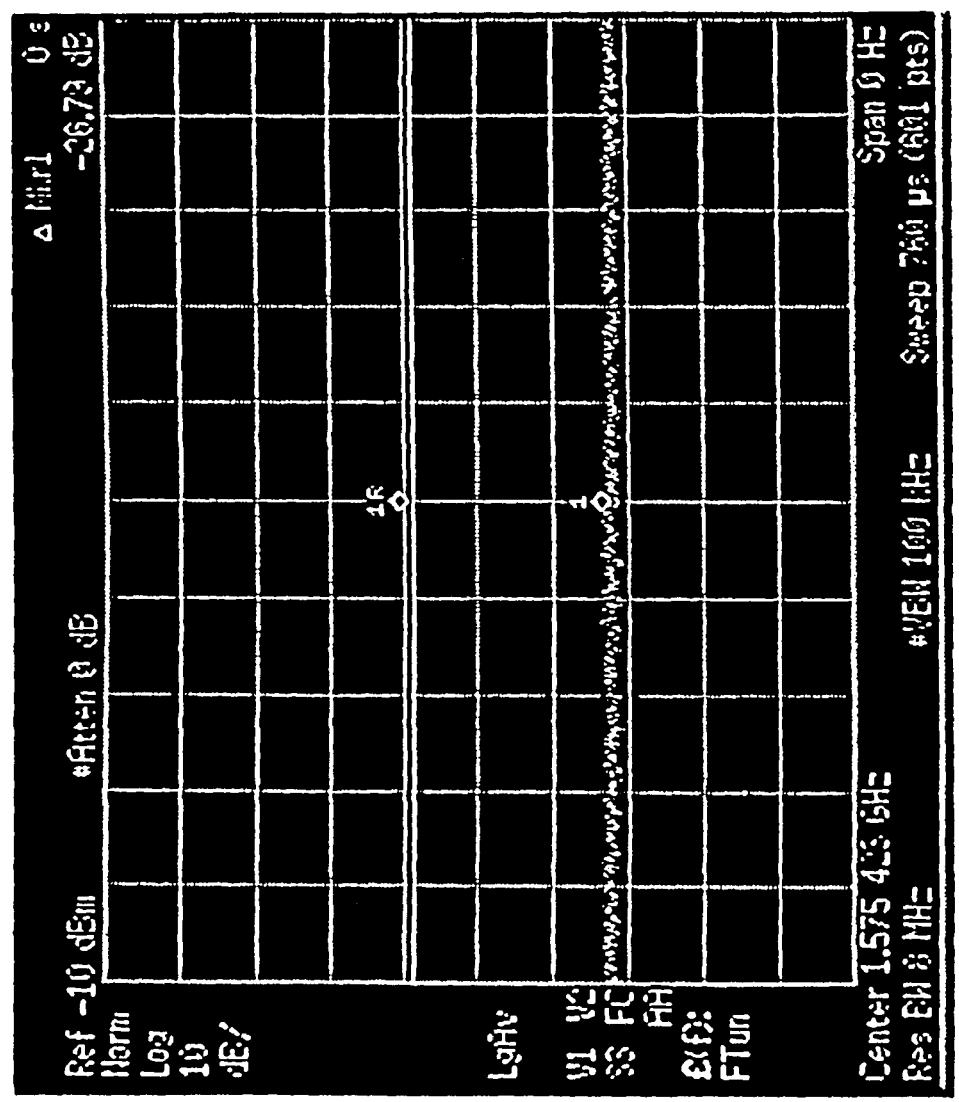
FIG. 5 is an exemplary spectrum analyzer plot of a null at a particular level of input power for a GPS receiver in accordance with the invention.

Referring to FIG. 4, an exemplary graph is shown of the nuller performance. The data of FIG. 4 was obtained in a closed loop configuration, such that attenuation and phase steps of the CW nuller 10 were under control of the controller 26 (e.g., the nuller algorithm executed by the controller 26 set the phase and attenuation values). Specifically, FIG. 4 illustrates the nulling performance of the temporal nuller 10 against a 1575 MHz CW signal (L1 band). As can be seen, as input power is increased, the measured null depth also increases. As is evident from FIG. 4, the nuller 10 can provide at least 20 dB of performance enhancement against GPS CW interference. FIG. 5 is a spectrum analyzer plot of the null at −50 dB CW input.

Figure 6:
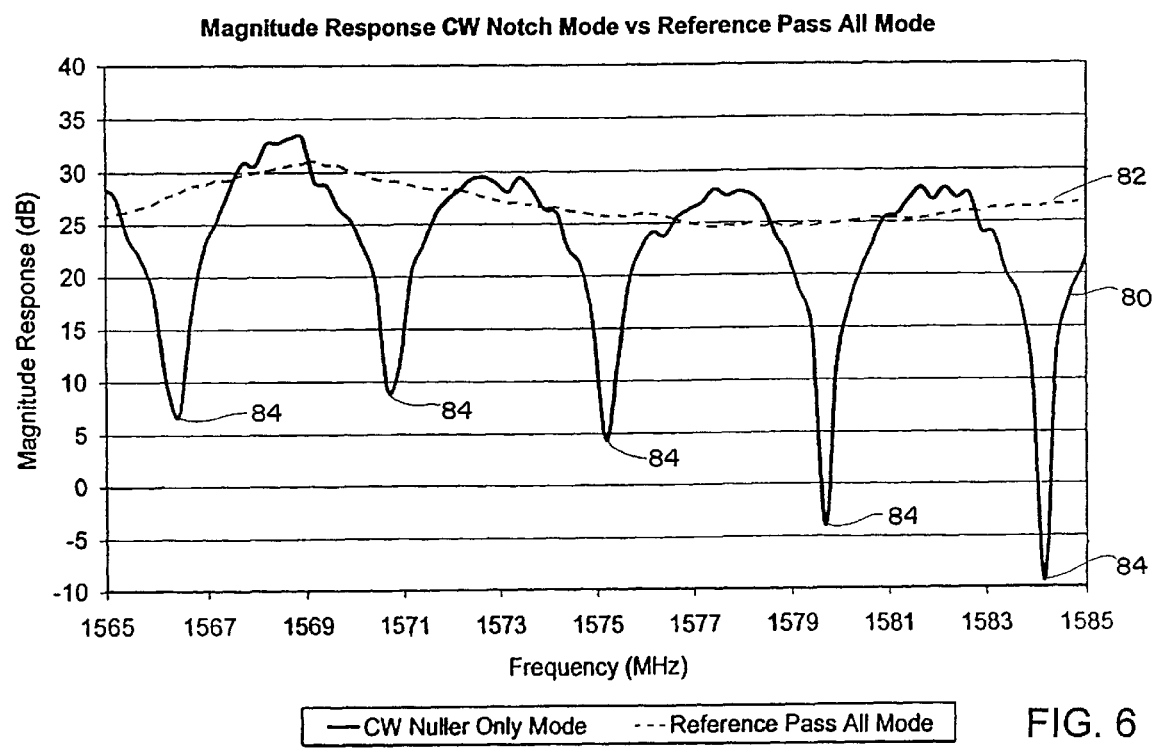
FIG. 6 is a graph showing a magnitude response for two different operational modes of a GPS receiver in accordance with the invention.

FIG. 6 depicts the frequency response measured at the GPS input for two modes; CW nuller mode only 80 (i.e., signals passing through both the first and second paths 14 and 22) and reference pass all mode 82 (i.e., all signals passing only through the second path 22). The GPS receiver 8, due to the correlation properties of the spread spectrum signal inside the receiver, will respond to the flat response of reference pass all mode 82 and not the notched response of CW nuller mode 80. As a result, the GPS signal will pass without degradation.

Further, looking at the CW nuller mode response 80 relative to reference pass all mode response 82, it is evident that the difference between these two responses at each notch point 84 is greater than 20 dB. The algorithm within controller 26 will search for these notches and select one based on current input conditions. Since any of the notches 84 can be selected, the minimum nulling offered by the nuller 10 is 20 dB.

It is noted that in the exemplary data provided in FIG. 6, the nuller performance was limited by a relatively large step size (i.e., 5.6 degrees) for the phase shifter 18. Increasing the step size resolution (i.e., decreasing the step size) would allow for more precise tuning and likely enhanced performance of the nuller 10.

Figure 7:
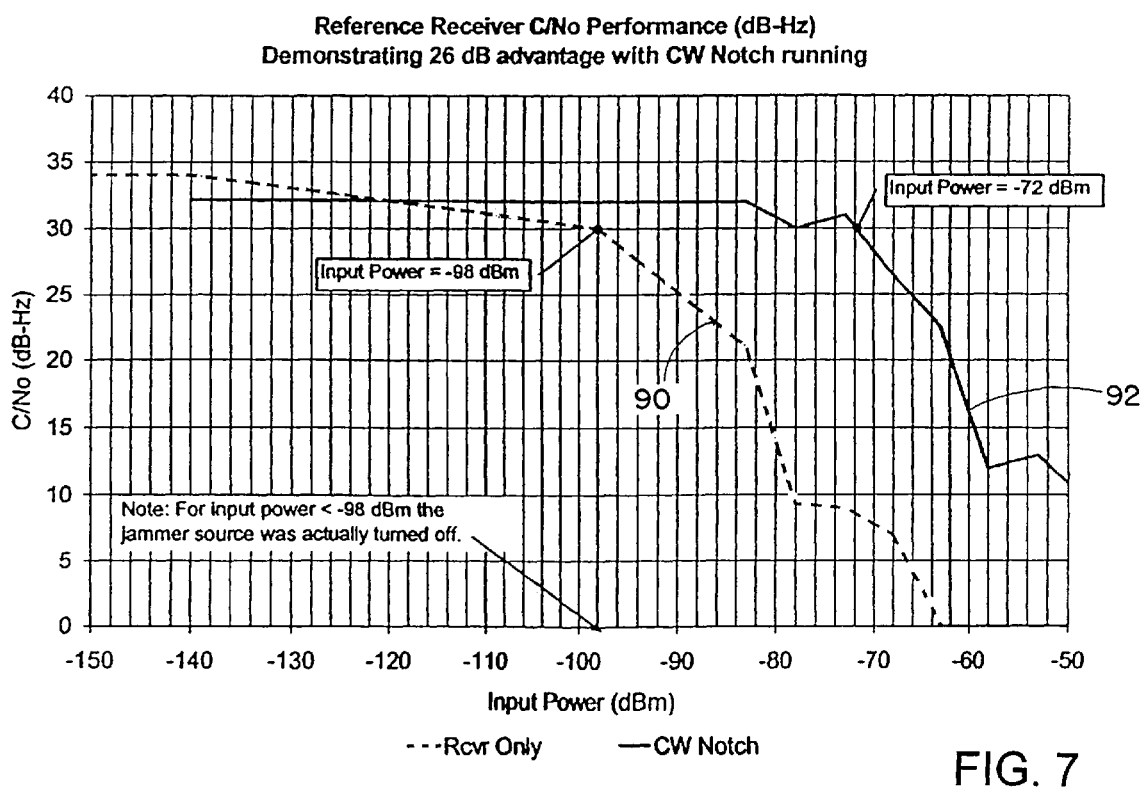
FIG. 7 is a graph showing reference receiver C/NO performance relative to input power for a GPS receiver in accordance with the invention.
Figure 8:
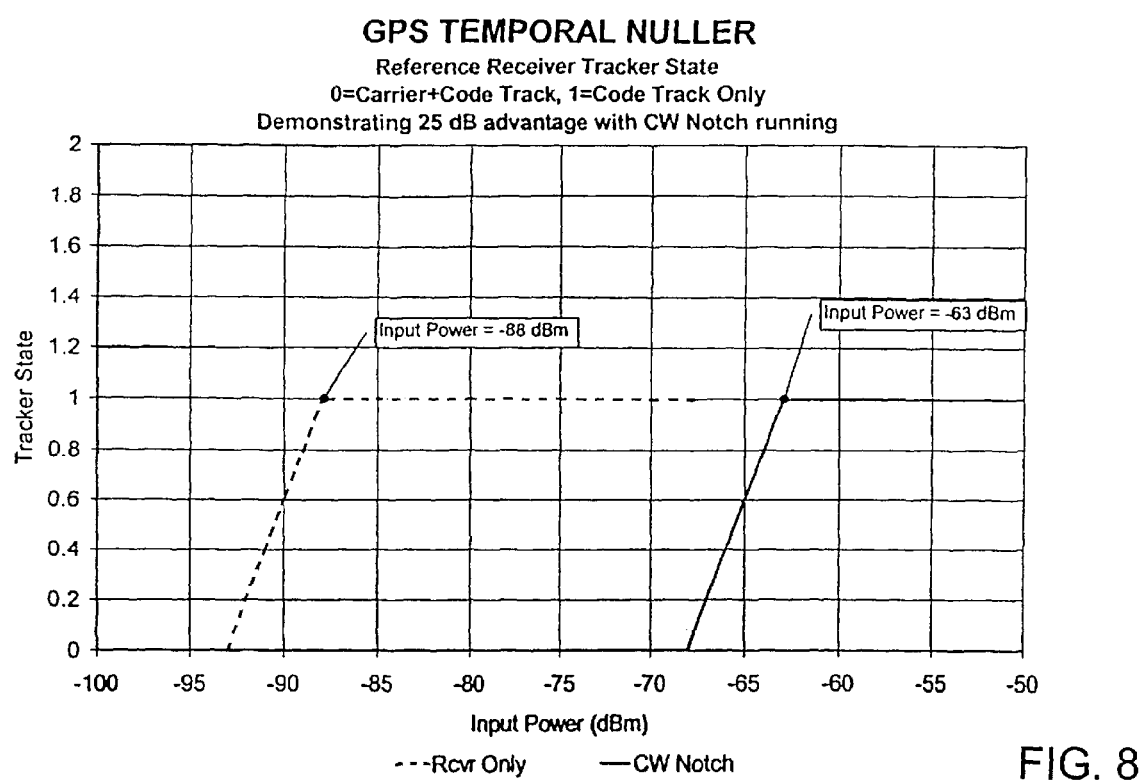
FIG. 8 is a graph showing the phase locked loop tracking of the GPS signal.

Referring now to FIGS. 7 and 8, the performance difference between a narrow band interferer with and without the CW nuller circuitry is shown. FIG. 7 illustrates the signal to noise ratio inside a GPS receiver 11 following the CW nuller 10. The vertical axis is C/NO (carrier to noise ratio in 1 Hz bandwidth) in dB/Hz, while the horizontal axis is the amplitude of the CW signal at the input of the receiver 11 in dBm. The receiver only curve 90 is normal operation without the CW nuller 10, wherein the signal to noise ratio starts degrading for interference powers above −98 dBm. The CW notch curve 92 shows the same performance, with the CW nuller 10 putting a null onto the interference. However, the CW notch curve 92 is shifted to the right by about 25 dB, which is the amount of extra interference power that can be tolerated when the CW nuller 10 precedes the GPS receiver 11.

FIG. 8 shows the phase locked loop (PLL) tracking of the GPS signal. Again, the improvement of tracking versus interference is improved on the order of 25 dB or more.

Accordingly, a simple time delay line and phase shifter can be used to introduce a null that cancels narrow band interference, thereby enhancing a GPS receiver's ability to track its signals. By varying the amount of delay and phase shift, the null can be tuned to meet the characteristics of the application. Moreover, the temporal nuller described herein may be implemented using inexpensive and simple components, thereby providing a low cost, reliable solution for countering CW GPS interference.

The actual code for performing the functions described herein can be readily programmed by a person having ordinary skill in the art of computer programming in any of a number of conventional programming languages based on the disclosure herein. Consequently, further detail as to the particular code itself has been omitted for sake of brevity.

Computer program elements of the invention may be embodied in hardware and/or in software (including firmware, resident software, micro-code, etc.).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A temporal nuller for removing or minimizing narrow band interference/jamming power from a global positioning system (GPS) receiver's input, comprising:

a first signal path including a first input node and a first output node;

at least one time delay device located within the first signal path, said at least one time delay device operative to introduce a time delay between a signal at an output of the at least one time delay device relative to a signal at an input of the at least one time delay device;

a second signal path including a second input node and a second output node, wherein the first signal input node is connected to the second signal input node, and the first signal output node is connected to the second signal output node, and an attenuator located in the second signal path, said attenuator operative to attenuate a signal in the second signal path, wherein the at least one time delay device includes a first time delay device and a second time delay device, the temporal nuller further comprising a switch operatively coupled to the first and second time delay devices, said switch operative to connect either the first or second time delay device in the first signal path.

2. The temporal nuller of claim 1, further comprising a phase shift device in the first signal path, said phase shift device operative to introduce a phase shift between a signal presented at an input of the phase shift device and an output of the phase shift device.

3. The temporal nuller of claim 2, wherein the phase shift device is adjustable so as to vary an amount of phase shift introduced by the phase shift device.

4. The temporal nuller of claim 2, wherein the time delay device is an adjustable time delay device or a fixed time delay device.

5. The temporal nuller of claim 1, wherein the time delay device is a surface acoustic wave device.

6. The temporal nuller of claim 1, wherein the time delay device is adjustable so as to vary an amount of time delay introduced by the time delay device.

7. The temporal nuller of claim 1, further comprising a GPS receiver operatively coupled to the first and second signal output nodes.

8. The temporal nuller of claim 1, further comprising a spatial nuller.

9. The temporal nuller of claim 1, wherein the first time delay device introduces a time delay corresponding to the L1 frequency band, and the second time delay device introduces a time delay corresponding to the L2 frequency band.

10. A temporal nuller for removing or minimizing narrow band interference/jamming power from a global positioning system (GPS) receiver's input, comprising:
a first signal path including a first input node and a first output node;
a phase shift device in the first signal path, said phase shift device operative to introduce a phase shift between a signal presented at an input of the phase shift device and an output of the phase shift device;
at least one time delay device located within the first signal path, said at least one time delay device operative to introduce a time delay between a signal at an output of the at least one time delay device relative to a signal at an input of the at least one time delay device;
a second signal path including a second input node and a second output node, wherein the first signal input node is connected to the second signal input node, and the first signal output node is connected to the second signal output node;
a controller operatively coupled to the phase shift device; and
a power detection device operatively coupled to the first and second signal output nodes and to the controller, wherein said power detection device provides data regarding a power output at the first and second signal output nodes to the controller, and the controller is operative to adjust the phase shift of the phase shift device so as to achieve a minimum power output at the first and second output nodes.

11. The temporal nuller of claim 10, further comprising an attenuator located in the second signal path, said attenuator operative to attenuate a signal in the second signal path, wherein the controller is operatively coupled to the attenuator so as to adjust attenuation to balance signals in the first and second signal paths.

12. The temporal nuller of claim 10, wherein the controller is implemented as a field programmable array.

13. The temporal nuller of claim 10, wherein the power detector implements a log detection function.

14. A method for removing or minimizing narrow band interference/jamming power from a global positioning system (GPS) receiver's input signal, comprising:
forming a narrow band null in at least a portion of the input signal, wherein forming the narrow band null includes
a) splitting a GPS signal into a first signal path and a second signal path,
b) introducing a time delay into the first signal path, and
c) recombining the first and second signal paths; and
attenuating a signal in the second signal path so as to balance an amplitude of signals in the first and second signal paths, wherein forming the null further includes introducing a phase shift in the first signal path so as to move the null to a frequency in which the interference/jamming power appears.

15. The method of claim 14, further comprising:
measuring a power output at the recombined first and second signal paths; and
adjusting the phase shift so as to achieve a minimum power output at the recombined first and second signal paths.

16. The method of claim 14, further comprising providing the recombined first and second signals to a GPS receiver.

17. The method of claim 16, wherein introducing a time delay includes adjusting the time delay to minimize interference with the GPS receiver's ability to recover a total GPS signal.

18. The method of claim 14, further comprising introducing multiple time delays, wherein each time delay corresponds to a frequency band of the received GPS signal.

* * * * *